United States Patent [19]

Kite, III et al.

[11] Patent Number: 4,836,080
[45] Date of Patent: Jun. 6, 1989

[54] VIBRATION ABRASIVE RESISTANT FABRIC COVERING

[75] Inventors: Joseph S. Kite, III, West Chester; Marie C. Tresslar, Plymouth Meeting, both of Pa.

[73] Assignee: The Bentley-Harris Manufacturing Company, Lionville, Pa.

[21] Appl. No.: 79,737

[22] Filed: Jul. 29, 1987

[51] Int. Cl.$^4$ .......................... D04C 1/02; F16L 11/02
[52] U.S. Cl. ................................. 87/9; 87/1;
  87/6; 138/123; 138/125; 428/224; 428/228
[58] Field of Search ...................... 87/1, 5-9,
  87/11, 13; 138/123, 125-127; 428/224, 225, 228

[56] References Cited
U.S. PATENT DOCUMENTS

| | | | |
|---|---|---|---|
| 3,022,802 | 2/1962 | Lewis | 138/125 |
| 3,481,368 | 12/1969 | Vansickle et al. | 138/125 |
| 3,500,867 | 3/1970 | Elson | 138/125 |
| 3,886,980 | 6/1975 | Elson | 138/127 |
| 4,259,991 | 4/1981 | Kutnyak | 138/127 |
| 4,276,908 | 7/1981 | Horne | 138/125 |
| 4,576,081 | 3/1986 | Felthuis et al. | 87/8 X |

Primary Examiner—John Petrakes
Attorney, Agent, or Firm—John T. Synnestvedt; Charles H. Lindrooth

[57] ABSTRACT

Disclosed herein are woven, knitted or braided fabric coverings having an increased abrasive resistance under vibrating conditions which are suitable for hoses, wires, tubes, harnessing, etc. where vibration under abrasive conditions causes rapid wearing of protective coverings. The resistance to these conditions is achieved by incorporating into the fabric of a flexible first yarn, a second yarn of a metal wire filament of comparable flexibility as the first yarn and forming a matrix to protect the first yarn. Also disclosed is the method of making the protective coverings from these fabrics.

7 Claims, 1 Drawing Sheet

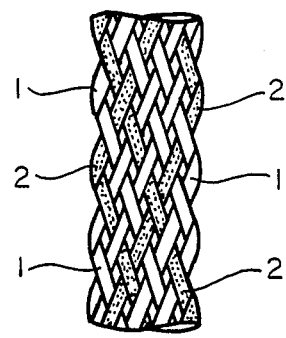
FIG_1
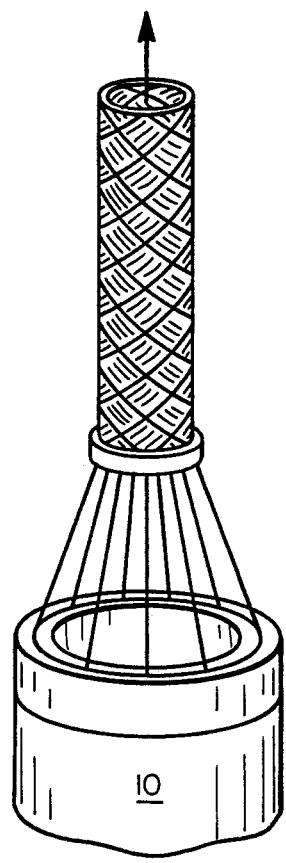
FIG_2

VIBRATION ABRASIVE RESISTANT FABRIC COVERING

BACKGROUND OF THE INVENTION

1. Field of the Invention

This invention relates to protective woven, knitted, or braided fabric sleeve coverings for products subject to vibrating or abrasive conditions. More particularly the invention relates to sleeve type products which are braided.

2. Description of the Prior Art

The need for an economical, protective covering particularly under abrasive, vibrating conditions, whether hot or cold, and particularly under hot conditions is well known in the art. The problem which the art has is that vibration causes flexing of the protective sleeve coverings made from glass, ceramic, and polymer filaments. The conditions cause constant abrading of filaments as they rub each other during flexing. The problem is compounded by environmental abrasive conditions, especially under hot conditions.

Nothing in the following prior art taken singularly or together, has addressed these conditions or has suggested the invention disclosed herein which overcomes these conditions.

U.S. Pat. No. 4,158,984, describes using yarns of two different wires to form a braid. One wire has high durability and low tensile strength and the other has a low durability and high tensile strength. The flexibility of the material is different for either wire. The material is costly, and is suitable only for high fluid pressure hoses. It is opposite to the invention described herein.

U.S. Pat. No. 3,815,468 describes using a braided fabric of filaments of a fluorocarbon sold under the trademark TEFLON and high temperature nylon filaments in which the filaments are washed with solvents to remove the sizing and then impregnating each fiber with a resin. These types of fabrics are useful for bearing surfaces, but are expensive and suitable for covering items such as automotive hoses, where the impregnated resin burns away and flakes off.

U.S. Pat. No. 2,335,088 describes the use of two fabric covers for electric wiring to prevent festooning. This is opposite to Applicants' use of only one cover.

U.S. Pat. No. 1,122,037 describes a fabric for wicking of oils and lubricants that is the taking in of heat, oil and other environmental products. This is opposed to Applicants' invention which protects against the entry of these products.

U.S. Pat. No. 3,196,737 describes a gland packing material of polytetrafluoroethylene (PTFE) and asbestos string to cover a core of other fibers. This is opposite to Applicants' invention of a single sleeve protective covering for hoses and wires under vibrating, not compression packing.

SUMMARY OF THE INVENTION

The flexible fabric sleeve products of this invention are for protecting and covering hoses, tubes, wiring used under abrasive and vibrating conditions such as automotive hoses for engines, electric tubing and cables used by manufacturing robots, etc. The fabric sleeve product is comprised of a first yarn of a flexible filament of quartz, glass, ceramic, or polymer filament or members thereof, and a second yarn of a flexible metal wire such as stainless steel or black iron. The first and second yarns are woven, knitted or braided together, and the number of strands of the second yarn are from two (2) to twenty-five (25) percent of the total number of strands of the first yarn and second yarn. The fabric sleeve product has a flexibility substantially equal to the flexibility of a fabric sleeve made only of the first yarn. The second yarn is distributed throughout the fabric to form a matrix and protects the fabric from falling apart under abrasive, vibrating conditions.

A fabric sleeve braided with fiberglass yarn interspersed with about 8% of fine stainless wire, for example eight strands of the fine stainless steel wire for every eighty-eight strands of fiberglass yarn, has greater abrasion and vibration resistance than a fabric sleeve made only from fiberglass yarn.

BRIEF DESCRIPTION OF THE DRAWINGS

FIG. 1 illustrates a diametric cutaway section view of a braided hose cover, showing the inersplicing of the wire strands.

FIG. 2 illustrates, in schematic, the hollow elongate sleeve of FIG. 1 being formed.

DESCRIPTION OF THE INVENTION AND BEST MODE OF CARRYING OUT THE INVENTION

The knitted, woven, or braided articles formed from the teachings of this invention are useful for many different protective coverings of products used under abrasive, vibrating conditions and particularly those used under abrasive, vibration and high temperature conditions like the hoses for engines in trucks, buses and cars.

The flexible articles are made from a first and a second yarn. The first yarn is of a flexible filament of a material of glass, ceramic or quartz, or an engineering plastic polymer or mixtures thereof. The material is chosen based on the article to be protected, type of environmental conditions, and the costs of such material. For high temperature operation under vibrating and abrasive conditions such as hoses for car, bus and other engines, a preferred material is glass, because of cost, and the glass can be of either of electrical, structural, high-strength glass or chemical grades. Preferably it is a continuous filament of E glass.

For other conditions and operations, the first yarn is selected from an engineering plastic polymer, such as aramid polymers of the kind sold under the trademark KEVLAR, polyester, nylon 6, nylon 6/6 and other nylon polymers used in their normal ambient humidity conditions.

The second yarn is of a metallic wire suitable for the flexible fabric sleeve type coverings described herein. Such metallic wires are steel, black iron, inconel, copper, or other suitable metallic wire as known by those skilled in the art and based on the teachings of this invention, particularly preferred is stainless steel. The diameters of the first and second yarn strands vary depending upon the size of the article and the product to be covered, but preferably that of the wire is from about 3 to 8 mils in diameter.

The sleeve type coverings described herein are formed by weaving, knitting or braiding together the first and second yarns. The number of strands of the second yarn are from two (2) to twenty-five (25) percent or more of the total number of strands of yarns used in the making of the articles of this invention. The number being chosen based on the particular use, environmental conditions, costs, and the article to be covered. Preferably the second yarn of flexible wire is uniformly distributed throughout the knitted, woven or braided article. The choice of the number of strands of second yarn is such that the flexibility of the articles is substantially that of the flexibility of the article if made only from the first yarn. Preferably the number of strands of the second yarn to the total number of strands of both first and second yarns is from about two (2) to twelve (12) percent, but more preferably from three (3) to eight (8) percent of the total number of strands.

Preferably the flexible sleeve type coverings made from the invention described herein are made by braiding, and in the braiding the wire strands of the second yarn are evenly spaced. The first yarn and second yarn may each be fed off of separate bobbins or carriers on the braider or may be combined in desired ratios on the carriers. A preferred method of braiding is to have the number of carriers of the first yarn; for example, of glass fiber be eighty eight (88) and that of flexible wire such as stainless steel is eight (8) and the number of ends per carrier is two (2) for the first yarn of glass fiber and for the second yarn of stainless steel wire is one (1). It is highly preferred that the second yarn of wire strands should be evenly spaced about the deck of the braider with half of them going in a first direction and half in a second direction which is opposite to that of the first direction, so that the wire strands cross over each other forming a matrix which locks in the first yarn.

In products made by the teachings of the invention described herein, one can have from two to twenty-five percent of the total number of yarns being of a larger diameter than the remaining yarns.

Referring now to the figures, one of the preferred embodiments of this invention is illustrated. In FIG. 1, a braided tubular sleeve is illustrated wherein two ends of a type E glass yarn (1) is reinforced with one end of stainless steel yarn.

Referring to drawn 2 wherein there is shown a braiding apparatus 10 forming the braided hollow elongate sleeve of FIG. 1. (A sleeve as described in Example 1.)

This type of braided tubular abrasion resistant sleeve for covering automobile engine hoses is illustrated in Example 1.

EXAMPLE 1

A ⅝ inch I.D. sleeve is braided from two ends of a type E glass fiber, and one end of a 6 mil diameter stainless steel wire. The two ends of the glass were loaded on 88 carriers and the one end of stainless steel was loaded on 8 carriers, which were evenly spaced around the deck of the braider with four going in one direction and four going in the opposite direction. The sleeve had 12 picks per 25 mm of sleeve. This sleeve was tested against a prior art braided sleeve made only from spiral fiberglass bead in a simultated engine environment of an automobile. The prior art braided sleeve failed after 100 hours of testing. The sleeve of this invention described in the above example failed after 300 hours of testing. It had a 200 percent increase in useful life.

EXAMPLE 2

The construction of the sleeve is similar to that of Example 1 except that the stainless steel wire was 8 mils in diameter.

While the instant invention has been described by reference to what is believed to be the most practical embodiments, it is understood that the invention may embody other specific forms not departing from the spirit of the invention. It should be understood that there are other embodiments which possess the qualities and characteristics which would generally function in the same manner and should be considered within the scope of the invention. The present embodiments therefore should be considered in all respects as illustrative and not limited to the details disclosed herein but are to be accorded the full scope of the claims, so as to embrace any and equivalent apparatus and articles, and methods of manufacturing.

We claim:

1. A flexible fabric sleeve type covering suitable for protecting and covering of products used under abrasive and vibrating conditions, which comprises:
a first yarn of a flexible strand of a material selected from the group consisting of ceramic, quartz, glass, and engineering plastic polymer, and mixtures thereof, a second yarn of a flexible strand of a metallic wire selected from the group comprising stainless steel, black iron, inconel and copper, the number of strands of second yarn are from two (2) to twenty-five (25) percent of the total number of strands of both yarns, the second yarn having a diameter of about 3 to 8 mils, and said sleeve type covering having a flexibility substantially equal to the flexibility of a sleeve type covering made from only the first yarn, the second yarn being equally distributed throughout the covering in a matrix which protects the first yarn under abrasive, vibrating conditions.

2. The flexible fabric sleeve type covering as recited in claim 1, wherein the first yarn is a material selected for the group consisting of glass and an engineering plastic polymer selected from the group consisting of nylon, aranid, and polyester and the second yarn is stainless steel.

3. The flexible fabric sleeve type covering as recited in claim 2, wherein the number of strands of second yarn to the total number of strands of both first and second yarn is between three to twelve percent.

4. A flexible fabric sleeve according to claim 3 wherein the number of strands of the second yarn are from three (3) and eight (8) percent of the total number of strands of both yarns.

5. The flexible fabric sleeve type covering as recited in claim 2, wherein the first yarn is glass and the number of strands of stainless steel wire to the total number of strands of glass and stainless steel wire is from three to eight percent.

6. The flexible fabric sleeve type covering as recited in claim 5 wherein the covering is a braided tubular abrasion resistant sleeve for covering engine hoses.

7. A flexible fabric sleeve according to claim 1 wherein the sleeve is a braided sleeve.

* * * * *